United States Patent [19]

Zhou

[11] Patent Number: 5,021,035
[45] Date of Patent: Jun. 4, 1991

[54] TRACTION DRIVE UNIT

[75] Inventor: Rao-Sheng Zhou, Canal Fulton, Ohio

[73] Assignee: The Timken Company, Canton, Ohio

[21] Appl. No.: 532,865

[22] Filed: Jun. 4, 1990

[51] Int. Cl.⁵ .............................................. F16H 15/48
[52] U.S. Cl. ...................................... 475/183; 74/206
[58] Field of Search ............... 475/183, 184, 185, 348, 475/159, 195, 197; 74/206, 202

[56] References Cited

U.S. PATENT DOCUMENTS

| | | | |
|---|---|---|---|
| 651,410 | 6/1900 | Ball | 475/197 |
| 2,514,701 | 7/1950 | Landberg et al. | 74/206 |
| 3,283,614 | 11/1966 | Hewko | 475/195 |
| 3,364,761 | 1/1968 | Nasuytis | 74/208 |
| 3,375,739 | 4/1968 | Nasuytis | 475/197 |
| 3,433,099 | 3/1969 | Nasuytis | 475/195 |
| 3,475,993 | 11/1969 | Hewko | 475/195 |
| 4,052,915 | 10/1977 | Kraus | 475/195 |
| 4,435,998 | 3/1984 | Kinoshiya | 74/206 X |
| 4,617,838 | 10/1986 | Anderson | 475/195 |
| 4,620,455 | 11/1986 | Kraus | 475/159 |

FOREIGN PATENT DOCUMENTS 0218170  3/1942  Switzerland ............... 475/183

OTHER PUBLICATIONS

A Historical Perspective of Traction Drives and Related Technology, by Stuart H. Loewenthal, (prior to 6-4-90).

Primary Examiner—Allan D. Herrmann
Assistant Examiner—Dan Wittels
Attorney, Agent, or Firm—Gravely, Lieder & Woodruff

[57] ABSTRACT

A traction drive unit for transmitting rotary motion about an axis of rotation has an inner sun roller, an outer ring and planet rollers arranged in two circular rows between the sun roller and outer ring. The sun roller takes the form of a double cone having outwardly presented raceways which taper downwardly toward each other and thrust ribs that project radially beyond the large ends of the raceways. The outer ring has two inwardly presented tapered raceways which taper downwardly toward the ends of the ring. The inner planet rollers are tapered rollers which are organized in two circular rows along the raceways of the sun member. The outer planet rollers have crowned peripheral surfaces which contact the tapered raceways of the outer ring and the tapered side surfaces of the inner planet rollers. They are captured axially by reason of the taper of the outer raceways and inner planet rollers. The outer rollers revolve in pairs about axles which are fitted to end disks.

24 Claims, 2 Drawing Sheets

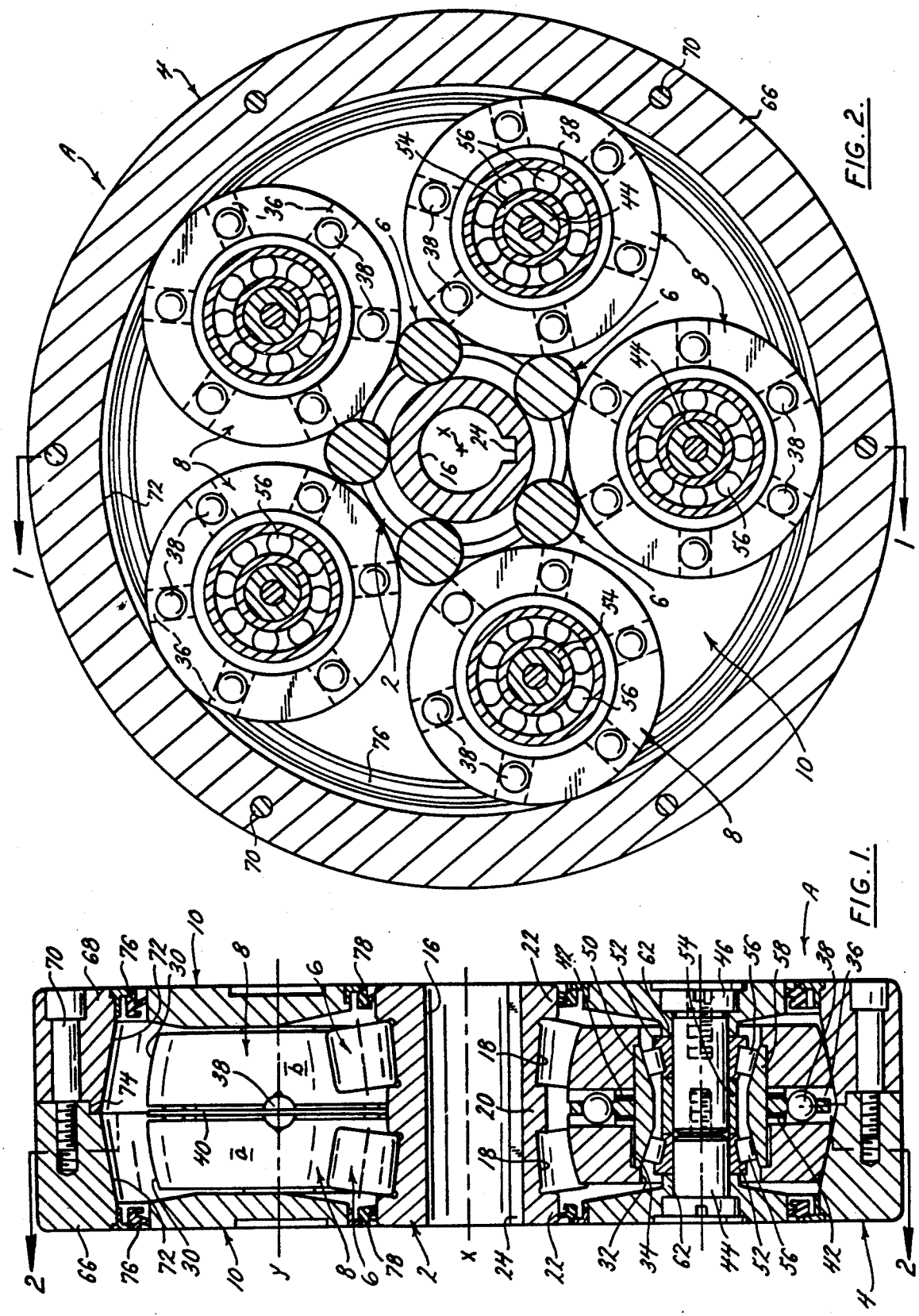

TRACTION DRIVE UNIT

BACKGROUND OF THE INVENTION

This invention relates in general to the transfer of rotary motion an more particularly to a traction drive unit for transferring such motion.

Several varieties of transmission exist for transferring rotary motion at both fixed speed ratios and variable speed ratios. Perhaps the most common is the so-called gear box in which the rotary motion is transferred through intermeshing gears. But gears with their teeth require extensive machining operations to form and thus are expensive. Moreover, they can be noisy and set up vibrations. Gears inherently contain backlash and are somewhat less than totally efficient.

Friction or traction drives, which rely on the friction between smooth contacting surfaces to transfer torque, possess some of these disadvantages, but at a lesser magnitude than gear boxes. In this regard, traction drive units require less complex machining and transfer the power smoothly and quietly. Moreover, they have the capacity to transfer power at extremely high velocities. They operate with no backlash and at high efficiency. Even so, the better friction drives are bulky and contain a multitude of rollers and other parts which are especially adapted or configured for such drives.

The present invention resides in a traction drive which has its components organized into a planetary system. In spite of this, the drive is highly compact and operates with high efficiency.

DESCRIPTION OF DRAWINGS

In the accompanying drawings which form part of the specification and wherein like numerals and letters refer to like parts wherever they occur:

FIG. 1 is a sectional view of a traction drive unit constructed in accordance with and embodying the present invention, the section being in a plane that contains the axis of rotation for the drive unit and being along line 1—1 of FIG. 2;

FIG. 2 is a sectional view taken along line 2—2 of FIG. 1, and

DETAILED DESCRIPTION

Figure 3:
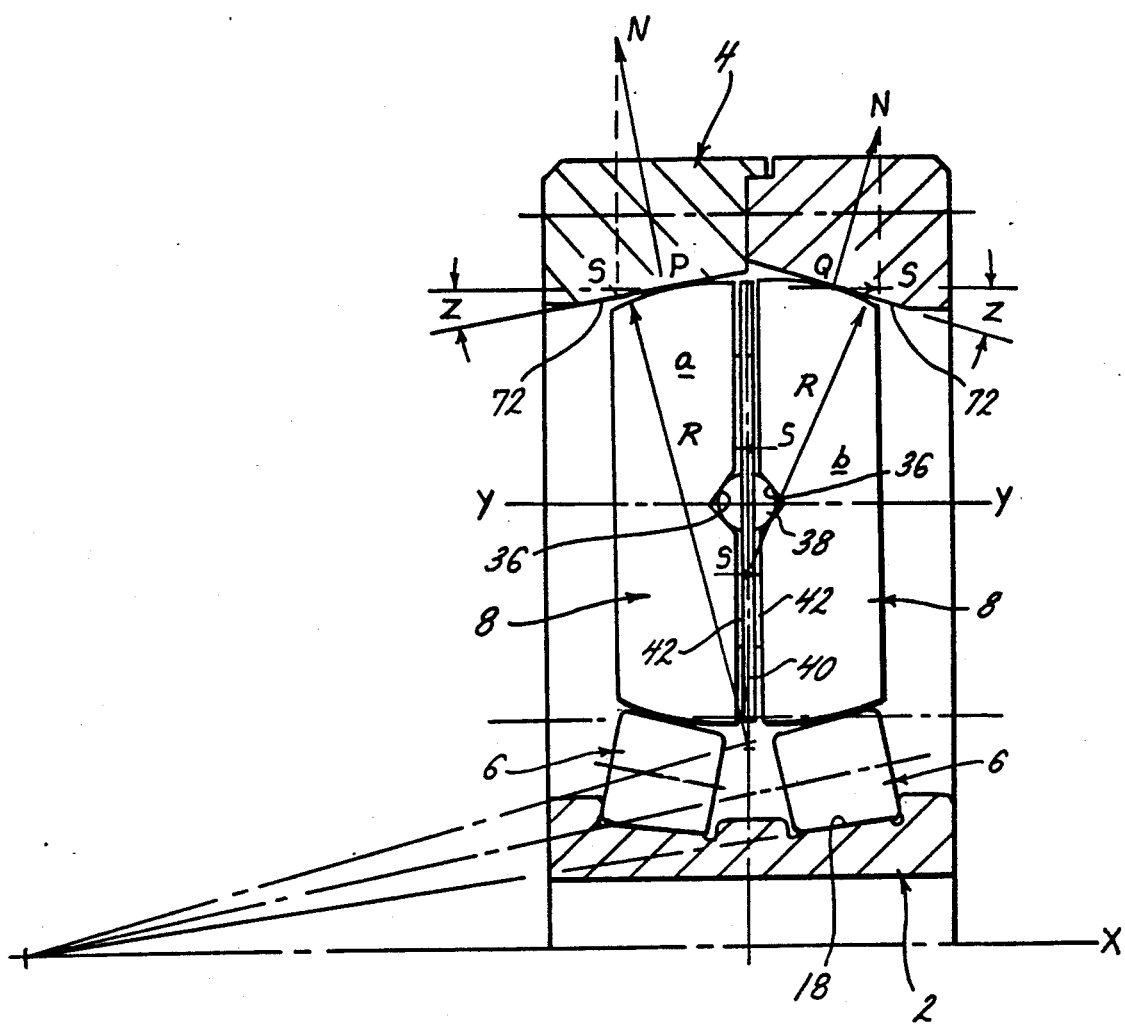
FIG. 3 is a sectional view showing raceways of different angles, somewhat exaggerated, to effect a differential in torque between the outer planet rollers of each pair.

Referring now to the drawings, a traction drive unit A transmits rotary motion and torque with great efficiency and no backlash. Despite being arranged in a planetary configuration, it is highly compact and inexpensive to manufacture, inasmuch as many of its components are derived from the traditional tapered roller bearing. The traction drive A includes several basic components, namely a sun member or roller 2, an outer ring 4, planet rollers 6 and 8 arranged in the space between the sun roller 2 and outer ring 4 where they are organized into inner and outer roller circles, respectively, and end disks 10 which extend across the ends of the inner and outer planet rollers 6 and 8 and close the annular space between the sun roller 2 and the outer ring 4. When transferring rotary motion and torque, the power may be applied at the sun roller 2, at the outer ring 4, or at either one of the end disks 10. The transmitted power may likewise be delivered at the sun roller 2, outer ring 4 or at the end disk 10. Whichever of the foregoing components is not used to receive or deliver torque is held fast by attachment to a case or other supporting structure. The sun roller 2, the end disks 10 and the outer ring 4 are arranged concentrically about an axis x, and indeed that axis serves as the axis of rotation for the two components where torque is applied and delivered.

The sun roller 2 is essentially nothing more than a double cone for a conventional tapered roller bearing. As such it includes a bore 16 and a pair of outwardly presented raceways 18 which taper downwardly toward a center rib 20 that separates the two raceways 18. At the large ends of its raceways 18, the sun roller 2 has thrust ribs 22 which extend out to the end faces of the roller 2. In contrast to a conventional double cone, the sun roller 2 has a keyway 24 along its bore 20.

The inner planet rollers 6 encircle the raceways 18 of the sun roller 2 where they are arranged in two circular rows a and b which are separated by the center rib 20 of the sun roller 2. Across this rib, the rollers 6 are arranged in pairs, there being a roller 6 in the row b for every roller 6 in the row a. The thrust ribs 22, on the other hand, prevent the rollers 6 from being expelled up the taper of the raceways 18. The rollers 6 are identical, and indeed each is nothing more than a conventional tapered roller of the type used in a tapered roller bearing. The tapered rollers 6 roll along the raceways 18 with their large end faces against the thrust rib 22, and, are on apex. This means that the envelopes formed by the tapered side surfaces of the rollers 6 for the row a have their apices at a common point along the axis x—indeed, essentially the same point as apex for the tapered raceway 18 for along which they roll—and the same holds true for the tapered rollers 6 of the row b (FIG. 3). This ensures essentially pure rolling contact between the rollers 6 and the raceways 18. Whereas, the rollers of a tapered roller bearing are located quite close to one another, the inner planet rollers 6 are spaced quite far apart, so that they cradle the outer rollers 8 and maintain the proper circumferential spacing between them.

Like the inner planet rollers 6, the outer planet rollers 8 are organized into two rows a and b and in pairs, there being for every outer roller 8 in the row a, a corresponding outer roller 8 in the row b. Indeed, corresponding rollers 8 in the rows a and b revolve about common axes y which are parallel to the center axis x. The outer rollers 8 of the row a contact the inner rollers 6 of the row a and likewise the outer rollers 8 of the row b contact the inner rollers 8 of the row b. Actually, the outer rollers 8 are offset circumferentially with respect to the inner rollers 6 such that each outer roller 8 contacts two inner rollers 6. Thus, the inner rollers 6 cradle the outer rollers 8 and thereby maintain the correct circumferential spacing between the outer rollers 8 of each row a and b.

In contrast to the inner rollers 6, which being tapered rollers have essentially conical side surfaces, the outer rollers have curved or crowned peripheral surfaces 30 and indeed the rollers 8 of any pair form a common crown. Within any pair, the peripheral surface 30 of the roller 8 for the row a is beveled downwardly toward the end disk 10 along that row, while the peripheral surface 30 for the corresponding roller 8 in the row b is beveled downwardly toward the end disk 10 along that row. The outer planet rollers 8, of course, contact the inner planet rollers 6 along the crowned peripheral surfaces 30.

Each outer roller 8 has bore 32 which opens toward the nearby end disk 10 and a counterbore 34 which opens toward the corresponding roller 8 in the other row a or b. The surfaces of the bore 32 and counterbore 34 have their common center axis along the axis y, and the peripheral surface 30 lies concentric to these surfaces. While the axial dimension of the outer rollers 8 is somewhat greater than the axial dimension of the inner rollers 6, a space does exist between the two outer rollers 8 of each pair. Each outer roller 8 of a pair has several radial grooves 36 which open into this space from the inside end face of the roller 8. The grooves 36 are arranged in radial symmetry and are V-shaped in cross-section. Within each pair of outer rollers 8, the grooves 36 of the roller 8 for the row a are presented opposite the grooves 36 to the row b. Each set of opposed grooves 36 holds a spacer ball 38, and the several balls 38 between the pair of rollers 8 are retained in a cage 40. Thus, the balls 38 separate the two outer rollers 8 of any pair and further synchronize those rollers, while the cage 40 keeps the balls 38 in their respective grooves 36. The cage 40 further serves as a backing for two wave springs 42 which bear against the end faces of the outer rollers 8 of any pair and urge them apart.

The several pairs of outer planet rollers 8 revolve between the two end disks 10 which are in turn attached to each other by axle studs 44 and machine screws 46. The studs 44 correspond in number to the pairs of outer rollers 8 and indeed each stud 44 projects through a different pair of rollers 8. The studs 44 have heads which fit into one of the end disks 10, but the shank or main body of each stud 44 occupies the space between the two disks 10. Indeed, the studs 44 extend all the way to the other end disk 10 and are in fact received in the other end disk 10. Here the screws 46 thread into the studs 44 and thus prevent the disks 10 from separating.

While the several pairs of outer planet rollers 8 revolve about the axle studs 44, they do not actually contact the studs 44. Instead, each stud 44 is fitted with a two row tapered roller bearing 50 on which the two outer rollers 8 for that stud are mounted. Each tapered roller bearing 50 has a pair of cones 52 which fit snugly over the stud 44 and a spacer 54 located between the cones 52. The cones 52 have their back faces presented outwardly toward the end disks 10, and as a consequence their raceways tapered downwardly toward the spacer 54. In addition, each bearing 50 includes tapered rollers 56 arranged in two circumferential rows, there being a separate row around the raceway of each cone 52. Finally, the bearing 50 has a double cup 58, that is a unitary cup having two raceways—one for each row of rollers 56. The two end disks 10 have inwardly directed bosses 62 which fit against the back faces of the cones 52 and hence the bearings 50 establish the spacing between the disks 10. Indeed, the screws 46, which thread into the studs 44, clamp the two cones 52 and the spacer 54 for each bearing 50 tightly between the two end disks 10. The spacer 54 of each bearing 50 controls the setting of the bearing 50, that is to say, whether or not it operates under a condition of end play or preload.

The double cup 58 of each bearing 50 has an outwardly presented cylindrical surface, and it is along this surface that the cup 58 is fitted to the pair of outer planet rollers 8 that the bearing 50 carries. The double cup 58 fits snugly into the counterbore 34 for the outer roller 8 of the row b and somewhat loosely into the counterbores 34 for the roller 8 of the row a. The fit of the roller 8 for the row a is just loose enough to enable that roller 8 to both rotate and shift axially a short distance on the cylindrical outer surface of the cup 58. Indeed, when the loose roller 8 of the row a rotates relative to the fixed roller 8 of the row b, the balls 38 in the V-shaped grooves will ride slightly up the inclined sides of the grooves and drive the loose roller 8 axially away from the fixed roller 8.

Other types of bearings may be used for the tapered roller bearings 50, particularly in the smaller units. For example, ball bearings or even sleeve bearings may be substituted for the tapered roller bearings 50.

The outer ring 4 consists of two races 66 and 68 which are clamped tightly together by machine screws 70 that pass through the latter and thread into the former. Each race 66 and 68 has an inwardly presented raceway 72, and these raceways taper downwardly toward the ends of the ring 4. Each lies within a conical envelope having its apex along the axis x. In short, the raceways 72 are on apex. In the region where the two raceways 72 meet, the two races 66 and 68 contain an offset 74 which serves to precisely align the races 66 and 68.

The outer planet rollers 8 contact the outer ring 4 along the raceway 72 of its races 66 and 68. In this regard, the crowned surfaces 30 of the rollers 8 for the row a contact the raceway 72 of race 66, whereas the crowned surfaces 30 of the rollers 8 for the row b contact the raceway 72 for the race 68. The crowned surfaces 30 of outer rollers 8 also contact the taper side faces of the inner planet rollers 6. The taper of the inner planet rollers 6 and the taper of the raceways 72 for the two races 66 and 68 effect a capture of the outer rollers 8 of the two rows a and b and hold the rollers 8 of each pair together against the spreading force exerted by its wave springs 42. As a consequence the rollers 8 of any pair do not experience significant axial movement within the annular space between the sun roller 2 and outer ring 4, yet remain under a preload imparted by the wave springs 42. Actually, some axial displacement of the loose rollers 8 in the row a relative to the fixed rollers 8 in the row b does occur, but this displacement only serves to drive the crowned peripheral surfaces 30 of the outer planet rollers 8 more tightly against the tapered surfaces of the inner planet rollers 6 and the tapered raceway 72 of the outer ring 4, and this of course retards slippage. Indeed, when the torque transmitted by the rollers 8 of the two rows a and b differs, the balls 38 ride up the inclined surfaces of the radial grooves 36 and spread the rollers 8 of the row a slightly away from the roller 8 of the row b.

One way to effect a difference in the torque that is applied to the two outer planet rollers 8 of each pair is to orient the raceways 72 of the outer ring 4 at slightly different angles. For example, the raceway 72 which the rollers 8 of the row b contact may be at a steeper angle z than the raceways 72 which the rollers 8 of the row a contact (FIG. 3—angles exaggerated for purposes of illustration). Also, the radii R for the crowned surfaces on the rollers 8 may be varied. Nevertheless, the raceways 72 and crowned surfaces on the rollers 8 are such that the points of contact P and Q between the crowned surfaces of the rollers 8 for any pair and the raceways 72 remain at the same distance from the common axis y of the rollers 8 for that pair (FIG. 3). The axial preload or spreading force S applied by the wave springs 42 to the two rollers 8 of each pair remains equal and of course is resisted at the raceways 72—indeed at the points of contact P and Q located along the raceways 72. By reason of the inclination of the raceways 72, the spreading force S translates into normal forces N of much greater magnitude, but because the raceway 72 for the row b lies at a steeper angle than the raceway 72 for the row a, the normal force N along the raceway for the row b is less than the normal force N for the raceway 72 along the row a. The coefficient of friction between the two rollers 8 of each pair and their respective raceways 72 remains essentially the same. Since the tangential force that actually effects a transfer of rotary motion between each roller 8 and the outer ring 4 along which it rolls is a function of the coefficient of friction and the normal force N, the tangential forces applied to the rollers 8 of each pair will differ by reason of the variance in the normal forces N, at least at the point of slippage. As a consequence, the rollers 8 of each pair experience different torques, at least at the point of slippage, and the balls 38 ride up the inclines of their radial grooves 36 and increase the spreading force S.

Actually the balls 38 and the variance in torque required for their successful operation are necessary only in larger traction units or those which transfer high torque. Simple wave springs 42 or other types of springs such as coil springs, will suffice for smaller units, that is to say the balls 38 and the radial grooves 36 which contain them are not necessary in smaller units that transmit lighter torque.

The two races 66 and 68 of the outer ring 4 carry outer seals 76 which establish barriers to the ingress of contaminants between the outer ring 4 and the end disks 10 and thus isolate the interior of the drive unit A in these regions, keeping lubricants in and contaminants out. Each seal 76 includes a seal case and an elastomeric seal element which is bonded to the seal case, and the latter has lips configured like those of the seal which is disclosed in U.S. Pat. No. 4,770,548. The seal cases, which are a metal stamping, are pressed into the races 66 and 68 at the ends of the outer ring 4. The lips of the elastomeric seal elements lie along the outer edges end disks 10 to establish live barriers in those regions. Seals of different configurations may also be used between the end disks 10 and the outer ring 4.

By the same token, the end disks 10 carry inner seals 78 which close the annular gaps between the end disks 10 and the sun roller 2 to isolate the interior of the traction drive A in those regions. Like the seal 76, each seal 78 includes a stamped metal case and an elastomeric seal element, the latter of which corresponds in configuration to the seal disclosed in U. S. Pat. No. 4,770,548. The seal cases of the seals 78 are pressed into the end disks 10 along the inner edges of those disks, whereas the elastomeric seal elements encircle the thrust ribs 22 of the double cone that forms the sun roller 2 and establish live barriers along those thrust ribs. Seals of other configurations may be used between the end disks 10 and sun roller 2.

The drive unit A lends itself to several modes of operation. In one, torque is applied to the sun roller 2, while the end disks 10 are held stationary. The sun roller 2 turns the inner planet rollers 6 which in turn rotate the outer planet rollers 8, and the latter, being against the raceways 72 of the outer ring 4, turn the outer ring 4. The ring 4 rotates at an angular velocity less than that of the sun roller 2, but in the same direction. Of course, when the torque is applied to the outer ring 4 with the disks 10 held fast, the roller 2 turns at a greater velocity in the same direction.

In the alternative, when the outer ring 4 is held stationary and the torque is applied to the sun roller 2, the end disks 10 rotate in the direction opposite to that of the sun roller 2. On the other hand, the torque may be applied to the end disks 10 and transmitted to the sun roller 2.

When the sun roller 2 is held stationary and the torque is applied to the end disks 10, the outer ring 4 rotates in the same direction as the end disks 10. Of course, torque may be applied at the outer ring 4 and extracted at the end disks 10.

This invention is intended to cover all changes and modifications of the example of the invention herein chosen for purposes of the disclosure which do not constitute departures from the spirit and scope of the invention.

What is claimed is:

1. A traction drive unit comprising: a sun member having outwardly presented first and second raceways which are beveled in opposite directions; an outer ring having inwardly presented raceways which are beveled in opposite directions, and planet rollers arranged in at least two circumferential rows of different diameter between the sun member and the outer ring with the rollers of the one row contacting the rollers of the other row, the rollers of the two rows being captured axially by the sun member and the outer ring.

2. A traction drive unit according to claim 1 and further comprising at least one end disk between the sun member and the outer ring and being beyond the rollers, and axles projecting from the end disk to establish axes about which the planet rollers of at least one of the circumferential rows revolve.

3. A traction drive unit for transmitting rotary motion about an axis of rotation; said unit comprising: a sun member having first and second outwardly presented raceways which taper downwardly toward each other; an outer ring encircling the sun member and having first and and second inwardly presented raceways which taper downwardly toward the ends of the ring; tapered inner planet rollers located around and contacting the raceways of the sun member, and being axially confined by the sun member; outer planet rollers located within the outer ring and contacting the raceways of the outer ring as well as the inner planet rollers and being axially confined by reason of the tapers of the inner planet rollers and the tapers of the inwardly presented raceways on the outer ring.

4. A traction drive unit according to claim 3 wherein the inwardly presented raceways of the sun member lie within substantially conical envelopes and the side surfaces of the inner planet rollers lie within substantially conical envelopes; wherein the envelopes have their apicies along the axis of rotation; and wherein the outer planet rollers have crowned peripheral surfaces where they contact the raceways of the outer ring and the side surfaces of the inner planet rollers.

5. A traction drive unit according to claim 4 wherein the sun member is a double cone having at its ends thrust ribs which are directed radially outwardly beyond the large ends of the raceways for the sun member.

6. The traction drive unit according to claim 5 wherein the outer ring is segmented into races with each race having one of the raceways on it, and the two races are clamped firmly together.

7. A traction drive unit for transmitting rotary motion about an axis of rotation, said drive unit comprising: a sun member having first and second tapered raceways which taper in opposite directions about the axis of rotation; tapered inner planet rollers arranged in first and second circular inner rows, with the rollers of the first inner row being around and contacting the first raceway of the sun member and the rollers of the second inner row being around and contacting the second raceway of the sun member; outer planet rollers arranged in first and second circular outer rows, with the rollers for the first outer row contacting the inner rollers of the first inner row and the outer rollers of the second outer row contacting the inner rollers of the second inner row: each roller of the outer rows having a beveled peripheral surface, with the bevel of the peripheral surface for the rollers of the first outer row being opposite to the bevel of the peripheral surface for the rollers of the second outer row, the rollers of the outer rows being arranged in pairs, with each pair containing a roller of the first row and a roller of the second row positioned in axial alignment and an outer ring having first and second raceways that are beveled in opposite directions, the peripheral surfaces for the outer rollers of the first outer row being against the first beveled raceway of the outer ring and the peripheral surfaces for the outer rollers of the second outer row being against the second outer raceway of the outer ring, the bevels of the first and second raceways of the outer ring effecting a capture of the outer planet rollers.

8. A traction drive unit according to claim 7 and further comprising at least one end disk located opposite to the ends of the outer planet rollers of the first row and axles extended from the disk and through the pairs of outer rollers to establish axes of rotation for the pairs of outer planet rollers.

9. A traction drive unit according to claim 8 wherein there are two end disks; wherein the pairs of outer planet rollers revolve between the two end disks; and wherein the axles extend between the two end disks.

10. A traction drive unit according to claim 8, and further comprising antifriction bearings located between the axles and the outer planet rollers which revolve about those axles.

11. A traction drive unit according to claim 9 wherein the two outer rollers of any pair rotate about the axle for that pair on the same antifriction bearing.

12. A traction drive unit according to claim 11 wherein each antifriction bearing has an inner race fitted to the axle, an outer race in the outer rollers of the pair that rotate about the axle, and rolling elements between the inner and outer races; and wherein one of the outer rollers on each bearing is fitted snugly to the outer race of the bearing and the other is fitted loosely to the outer race, so that the other can move slightly with respect to the outer race.

13. A traction drive unit according to claim 12 and further comprising means for urging the outer planet rollers laterally so that they bear tightly against the beveled raceways of the outer ring.

14. A traction drive unit according to claim 13 wherein the means for urging the outer rollers laterally urges the rollers of each pair apart.

15. A traction drive unit according to claim 14 wherein the means for urging the outer rollers laterally includes springs between the outer rollers of each pair.

16. A traction drive unit according to claim 15 wherein the springs are wave springs.

17. A traction drive unit according to claim 14 wherein the means for urging the outer rollers laterally includes inclined surfaces on the opposing faces of the outer rollers of each pair and rolling elements between the inclined surfaces, so that when the two outer rollers of any pair experience a differential in torque, the rollers spread apart.

18. A traction drive unit according to claim 17 wherein the inclined surfaces capture the rolling elements circumferentially and synchronize the rollers of each pair.

19. A traction drive unit according to claim 17 where the raceways of the outer ring are beveled at different angles.

20. A traction drive unit according to claim 7 wherein raceways of the sun member taper downwardly toward each other.

21. A traction drive unit according to claim 20 wherein the tapered raceways of the outer ring taper downwardly toward the ends of the ring and capture the outer planet rollers of the two outer rows between them.

22. A traction drive unit according to claim 21 wherein the peripheral surfaces of the outer planet rollers are crowned.

23. A traction drive unit according to claim 9 and further comprising outer seal means for establishing barriers between the outer ring and the end disks, and inner seal means for establishing barriers between the end disks and the sun member.

24. A traction drive unit according to claim 23 wherein the sun member is a double cone having its raceways tapered downwardly toward each other and further having thrust ribs at its ends and along the large ends of the tapered raceways; and wherein the inner seals are carried by the end disks and contact the thrust ribs.

* * * * *